3,335,053
COMPOSITIONS COMPRISING ALKYL BRANCHED, LONG-CHAIN, ALIPHATIC COMPOUNDS FOR INCREASING THE WATER VAPOR POROSITY OF FAT MATERIALS
Guenther Weitzel, West Tubingen, Germany, assignor to Kolmar Laboratories, Inc., Milwaukee, Wis., a corporation of Delaware
No Drawing. Filed Feb. 10, 1965, Ser. No. 431,718
The portion of the term of the patent subsequent to May 22, 1979, has been disclaimed
21 Claims. (Cl. 167—58)

This application is a continuation-in-part of an application Ser. No. 177,317, filed Mar. 13, 1962, now abandoned, which in turn is a continuation-in-part of Patent 3,035,987 and application Ser. No. 85,004, filed Jan. 26, 1961, now abandoned.

This invention relates to a process for increasing the water vapor porosity of fat components in cosmetic or pharmaceutical products and to a composition to be added to the fat components ot increase the water vapor porosity of the same.

In the physiological metabolism of the skin, the release of water vapor through the skin plays an important role, for an undisturbed release of water vapor from the skin is a vital question for a healthy skin. The normal skin releases about 0.3 gram of water per second per square centimeter and thus, the total skin area of a non-perspiring adult person releases about 450 milliliters of water vapor in 24 hours.

A cream or ointment film applied to the skin for cosmetic or pharmaceutical purposes has the main task of protecting the skin surface against harmful outside influences. While almost all fat bases used in ointments or creams have excellent covering properties, they hinder the outward penetration of water vapor given up by the skin. For example, lanolin ointment bases, fatty alcohols, mineral oils, waxes, etc., provide an excellent covering for the skin but prevent the flow of water vapor outwardly through the covering.

The present invention is based upon the discovery that by adding small amounts of an alkyl branched, long-chained, aliphatic compound to the fat components in cosmetic or pharmaceutical products, the water vapor porosity of the fat components is substantially increased. This increase in the water vapor penetration through the fat components is based on the loosening of the tightly packed fat film by the addition of the branch chain additives. These branch chain additives build areas of disturbance in the tightly associated normal fat chains which allows the passage of water vapor through the fat films by a type of chimney action. It has been found that relatively small amounts of the branch chain additives when added to the fat component are sufficient to counteract entirely the inhibition of the skin breathing by the fat materials.

The fat components to which the present invention is to be applied include the conventional fatty materials which are ordinarily used for cosmetic and pharmaceutical ointments, creams, locations, salves and the like. The fat materials include substances such as lanolin, petrolatum, lard, mineral oils, vegetable oils such as peanut oil, mono and diglycerides such as glycerine mono stearate and glycerine di-ricinoleate, polyethylene oxides such as carbo waxes, waxes such as spermaceti and beeswax, fatty alcohols such as cetyl, myristyl and lauryl alcohol, fatty acids such as stearic and palmitic acid, and other materials. The above-mentioned fat materials can be used alone or in combination to provide the fatty base for the cosmetic or pharmaceutical product.

The above-mentioned straight chain fat materials, when applied to the skin in thin layers either by themselves or as mixtures, cause a substantial decrease in the water vapor output of the skin. The water vapor output is reduced to a fraction of the normal value of that of the human skin which is not covered by the fatty materials.

According to the invention, the water vapor penetration of the fat or oil component can be substantially increased and thereby approximate that of uncovered human skin by the addition of branch chain aliphatic acids or branch chain aliphatic alcohols or esters of the acids and alcohols. The branch chain compound is employed in an amount of 1 to 95% by weight of the fat or oil material with the specific amount being determined by the nature of the cosmetic or pharmaceutical product and by economic practicality.

It has also been found that the branch chain additives are useful in nail lacquers. Water vapor is released through finger and toe nails and the conventional nail lacquer suppresses this release. By the addition of the branch chain additives to the nail lacquer, the water vapor release through the nails can be restored and regulated.

Acids which may be employed in the present composition are alkyl branch chain derivatives of aliphatic saturated or unsaturated carboxylic acids having from 2 to 24 carbon atoms in the open or straight chain, such as lauric, myristic, palmitic, stearic, oleic, linoleic, or the like. Alkyl branch chain derivatives of hydroxy carboxylic acids such as hydroxycaprylic, hydroxylauric, hydroxystearic and ricinoleic acid may also be used. In addition, alkyl branch chain derivatives of polycarboxylic acids can be employed, such as malonic, succinic, glutaric, adipic, pimelic, suberic, azelaic, sebacic, malic, fumaric, citric acid or the like.

The alkyl branch attached to the acid contains less than 5 carbon atoms in the radical and consists of a methyl, ethyl, propyl, isopropyl, butyl, or isobutyl group. Generally, a branch chain of 1 to 2 carbon atoms is preferred.

The branch chain can be located on any of the carbon atoms of the acid with the exception of the carbon of the carboxylic (COOH) group.

If the open chain contains at least 5 carbon atoms and if a single branch is present, it is preferred to space the branch at least one carbon atom from the carboxyl group and at least one carbon atom from the opposite end carbon in the chain. For example, if the alkyl branch is added to palmitic acid, the branch is usually not attached to No. 1, 2, 15 or 16 carbon atoms.

If more than one alkyl branch is present in the acid, it is preferred that at least one of the branches be located on the middle carbons in the chain and additional alkyl branches may be located on the end two carbons in the chain or elsewhere. One or more carbon atoms in the straight chain may have two alkyl branches.

Except for the alkyl branches, the monocarboxylic, polycarboxylic and hydroxy carboxylic acids should not contain other substituent groups.

The following compounds are examples of alkyl branched acids which can be employed as additives to fat components in cosmetic or pharmaceutical products to increase the water vapor porosity of the same: 5-methyl palmitic acid; 9-ethyl stearic acid; 7-methyl lauric acid; 3,7,11,15-tetramethyl palmitic acid; 4,6-diethyl lauric acid; 10-methyl oleic acid; 7-methyl ricinoleic acid; 3-methyl, 7-ethyl stearic acid; 3,7,10-methyl oleic acid; 7-ethyl hydroxy lauric acid; 10-methyl hydroxy stearic acid; 2-ethyl-hexanoic-acid, 2-isopropyl-octanoic acid; 7-methyl-decanoic acid; 2-butyl-myristic acid; 2-butyl-13 methyl-myristic acid; 10 methyl-undecyclic-acid, 4-ethyl-malonic acid; 2,2-dimethyl-succinic acid; 3,3-dimethyl-glutaric acid; 2-isopropyl-adipic acid; 2,5-dimethyl-adipic acid; 2,5-diisobutyl-suberic acid; and the like.

The alcohols to be used in the invention are alkyl branch chain derivatives of saturated or unsaturated monohydroxy or dihydroxy alcohols containing 2 to 24 carbon atoms, such as heptanol, decanol, lauryl alcohol, cetyl alcohol, stearyl alcohol, heptenol, decenol, oleyl alcohol, ethylene glycol, propylene glycol, hexylene glycol, and the like.

As in the case of the acid, the alcohol has at least one alkyl branch containing 1 to 4 carbon atoms and consisting of methyl, ethyl, propyl or isopropyl butyl or isobutyl. The alkyl branch can be attached to any carbon in the open chain. However, if the open chain contains at least 5 carbon atoms and if a single alkyl branch is present, it is preferred to space the alkyl branch at least one carbon atom from the end carbons in the open chain; that is the two end carbons in the chain are usually free of alkyl branches. As in the case of the acid, if more than one alkyl branch is present, it is preferred that at least one of the alkyl branches be located on the middle carbons in the straight chain and additional alkyl branches may be located on the end carbons in the chain or elsewhere. In addition, one or more carbon atoms in the straight chain may have two alkyl branches.

Except for the alkyl branches, the mono or dihydroxy alcohols should not contain other substituent groups.

Examples of branch chain alcohols to be used are as follows: 8-methyl cetyl alcohol; 12-ethyl stearyl alcohol; 5-methyl decanol; farnesol; phytol; citronellol; geraniol; 3,7,11,15-tetramethyl palmitol; 5-ethyl heptanol; 5-methyl decanol; 4-methyl, 6,8-ethyl lauryl alcohol; 9,11-methyl cetyl alcohol, 11,12-isobutyl lauryl alcohol; 9,10-methyl decanol; 8-ethyl, 9 propyl nonalol; neopentyl glycol; 2,2,4-trimethyl, 1,3-pentanediol; 2,5-dimethyl, 2,5-hexandiol; 2-ethyl-1,3-hexandiol; 2,6-dimethyl-4-heptanol; and the like.

In addition to the alkyl branch acids and alcohols described above, esters of the above acids and alcohols may also be employed to increase the water vapor porosity of the fat component. In this regard, the following esters can be used: (a) esters of the above-mentioned branch chain acids with straight chain aliphatic monohydroxy or polyhydroxy alcohols having up to 20 carbon atoms in the molecule such as methanol, ethanol, isopropanol, propanol, glycols, glycerol, erythritol, dulcitol, and the like; (b) esters of the above-mentioned branch chain alcohols with aliphatic, straight chain mono or polycarboxylic acids having up to 20 carbon atoms in the molecule such as acetic, butyric, hexanoic, oxalic, malonic, succinic acid, and the like; and (c) esters of the above-mentioned branch chain acids with the above-mentioned branch chain alcohols.

The straight chain alcohols of (a) above may have included other substitutent groups such as hydroxy or amino groups, as for example; aminoethanol, sphingosine, and the like. Similarly, the straight chain acids of (b) above may also include hydroxy or amino groups as illustrated by glutamic acid, aspartic acid, ricinoleic acid, and the like.

The following compounds are examples of esters which can be added to fatty materials to increase the water vapor porosity thereof; 5-methyl palmitic acid cetyl ester; 4,6-diethyl palmitic acid ethyl ester; 7-methyl myristic acid triglyceride, 3,7,11-trimethyl oleic acid decanate; farnesol laureate; citronellol palmitate; methyl octadecanol caprylate; 3,7,11,15-tetramethyl octadecanol acetate; 4,6-diethyl dodecanol laurate; 10-methyl oleic acid-8-methyl cetyl alcohol ester; 5-methyl palmitic acid-11-methyl cetyl alcohol ester; 7-methyl lauric acid geraniol ester; 4,6-diethyl lauric acid geraniol ester; 7-methyl lauric acid-5-methyl heptanol ester; 3,7,11,15-tetramethyl palmitic acid phytol ester; 7-methyl ricinoleic acid-4-methyl, 6,8-ethyl lauryl alcohol ester; 9-ethyl stearic acid farnesol ester; 10-methyl hydroxy stearic acid-3,7,11,15-tetramethyl palmitol ester; 7-ethyl stearic acid-5-methyl decanol ester; 10-methyl oleic acid citronellol ester; 3,7-dimethyl caprylic acid tri-glyceride; sorbitol mono-4,6-diisopropyl decanate; erythritol-tetra-2-ethyl hexanate; di-4-propyl-hexanol-α-propyl succinate; n-butyl malic acid monoethyl ester; tetrahydrogeranyl-3,7-dimethyl octanoate; α-isopropyl adipic acid dimethyl ester; tetrahydrogeranyl citrate; 10-isopropyl decanol-10-isopropyl decanate; 8-butyl nonalol-14-isopropyl myristate; and the like.

The branch chain acids, alcohols or esters are employed in combination with a fatty component in a cosmetic or pharmaceutical product generally in an amount of 1% to 95% by weight of the fatty component, and usually in an amount of 1% to 10% by weight of the fatty component, with the specific amount determined by the nature of the product and economic practicality. The branch chain material substantially increases the water vapor porosity of a fat material by building up areas of disturbance in the tightly associated normal fat chains which allow the penetration of water vapor by a type of chimney action.

As an example of the effectiveness of the branch chain materials in increasing the penetration of water vapor through a fatty material, a layer of 100% Vaseline or petroleum applied to human skin resulted in a water vapor penetration outwardly through the layer of 38% of that of uncovered skin. This means that the film of Vaseline prevented the passage of 62% of the water vapor which would normally be dissipated from an uncovered healthy skin. However, when using a composition consisting of 90% Vaseline and 10% 3,5-dimethyl myristic acid, a branch chain acid, in a substantially identical concentration on the human skin, the water vapor porosity of the film was increased to a value of 62% of that of uncovered skin. Similarly, when using a composition consisting of 90% Vaseline and 10% tetrahydrogeranyl palmitate ester in a substantially identical concentration, the water vapor porosity was increased to 71% of uncovered skin.

Tests were also conducted to show the improvement in water vapor porosity over compositions containing lanolin. In this regard, a composition consisting of 90% of a 1:1 ratio of Vaseline and laolin and 10% of 2,6-dimethyl-lauric acid was applied to the skin. This material increased the water vapor porosity to 84% of that of uncovered skin as compared with a value of 62% when using only Vaseline and lanolin in a 1:1 ratio. Similarly a composition consisting of 90% of a 1:1 ratio of Vaseline and lanolin and 10% dihydro-citronellol-palmitate improved the water vapor porosity to 82% of uncovered skin.

Similarly effective results have been shown with esters of branch chain alcohols and branch chain acids. For example, using a composition consisting of 5% tetrahydrogeranyl 3,7-dimethyl octanoic acid-ester and 95% of a 1:1 ratio of Vaseline and lanolin increased the water vapor porosity to a value of 70% of uncovered skin. When using 10% of tetrahydrogeranyl-3,7 - dimethyl-octanoic-acid-ester and 90% of the 1:1 ratio of Vaseline and lanolin in a similar concentration on the skin, the water vapor porosity was increased to 84% of uncovered skin, and when using 25% of the 4-methyl-lauric-acidtriglyceride and 75% of a 1:1 ratio of Vaseline and lanolin, the water vapor porosity was 94% of that of uncovered skin.

The tabulated results of the test are as follows:

| | Materials | Percent water vapor penetration compared with uncovered skin |
|---|---|---|
| 1 | 100% Vaseline | 38 |
| 2 | 90% Vaseline +10% 3,5-dimethyl-myristic acid | 62 |
| 3 | 90% Vaseline +10% tetrahydrogeranyl palmitate ester | 71 |
| 4 | 50% Vaseline +50% lanolin | 62 |
| 5 | 45% Vaseline +45% lanolin +10% 2,6-dimethyl-lauric acid | 84 |
| 6 | 45% Vaseline +45% lanolin +10% dihydrocitronellol palmitate | 82 |
| 7 | 47.5% Vaseline +47.5% lanolin +5% tetrahydrogeranyl-3,7-dimethyl octanoic acid ester | 70 |
| 8 | 45% Vaseline +45% lanolin +10% tetrahydrogeranyl-3,7-dimethyl-octanoic acid | 84 |
| 9 | 37.5% Vaseline +37.5% lanolin +25% 4-methyl-lauric acid triglyceride | 94 |

The following examples illustrate the preparation of the alkyl branch chain materials to be incorporated with the fat material in a cosmetic or pharmaceutical product.

PREPARATION OF ALKYL BRANCH CARBOXYLIC ACIDS

Example No. 1

To prepare 4-methyl myristic acid, 6-methyl palmitic acid, and 8-methyl stearic acid, 2-methyl dodecanol having a boiling point of 130–140° C. at 8 mm. of mercury is converted into its bromide by treating it with 48% hydrobromic acid. The resulting bromide is then reacted with malonic acid esters. This reaction product is 2-methyl-dodecanol-1 malonic acid ester with a boiling point of 202–205° C. at 7 mm. This ester is then saponified with an alcoholic sodium hydroxide solution. By the saponification 2-methyl-dodecal-1-malonic acid results. The heating of this acid at 10 mm. pressure to 200° C. decarboxylates the same to 4-methyl-myristic acid. The boiling point of this acid is 198–202° C. at 50 mm. and the melting point is 25–26° C.

The 4-methyl myristic acid is converted to its ethyl ester by boiling it with an ethanol-toluene mixture in the presence of concentrated sulfuric acid. This ester is then reduced with lithium aluminum hydroxide to 4-methyl tetradecanol having a boiling point of 136–140° C. at 0.5 mm.

The 4-methyl tetradecanol is again converted to its bromide with hydrobromic acid. The reaction of the resulting bromide with sodium malonic ester gives 4-methyl tetradecanol-1 malonic ester with a boiling point of 179–184° C. at 0.5 mm. Saponification and decarboxylation of this ester gives 6-metyl palmitic acid having a boiling point of 173° C. at 2 mm. of mercury and a melting point of 30–31° C.

Example No. 2

By the same synthesis set forth in Example 1 6-methyl hexadecanol is produced from the 6-methyl palmitic acid ethyl ester. From this latter compound the bromide is again built and reacted with sodium malonic acid ester which gives 6-methyl hexadecanol-1 malonic ester with a boiling point of 188° C. at 0.3 mm. of pressure. By saponification and decarboxylation of this product, 8-methyl stearic acid is produced which has a boiling point of 184° C. at 0 mm. pressure and has a melting point of 33–34° C.

PREPARATION OF ALKYL BRANCH ALCOHOLS

Example No. 3

The synthesis described in Example 1 also yields the higher monoalkyl branched fatty alcohols as for example 6-methylhexadecanol. If the end product of the above mentioned synthesis, 8-methly stearic acid, is converted to its ethyl ester and the ester is then reduced with lithium aluminum hydroxide or metallic sodium, 8-methyl octadecanol is produced which has a boiling point of 155° C. at 0.5 mm. of pressure.

PREPARATION OF THE ESTER OF A BRANCH CHAIN ALCOHOL AND A STRAIGHT CHAIN CARBOXYLIC ACID

Example No. 4

To prepare the ester of the alkyl branches fatty alcohol, such as dihydro citronellol myristinate, myristic acid chloride is reached with an equimolar amount of dihydro citronellol in pyridene. The yielded end product is dihydro citronellol myristinate having a boiling point of 226–228° C. at 0.5 mm. and has a saponification value of 152.2.

PREPARATION OF THE ESTER OF A BRANCH CHAIN CARBOXYLIC ACID WITH A STRAIGHT CHAIN ALCOHOL

Example No. 5

28.8 grams of 7-methyl myristic acid were dissolved in 120 cc. of a mixture of ethanol-toluene (2:1 ratio). 0.3 cc. of concentrated $H_2SO_4$ was added and the ethanol-toluene mixture was distilled off. Another 120 cc. of a fresh mixture of ethanol-toluene (2:1 ratio) was added and again distilled off. Solid $NaHCO_3$ was added to the distillation residue and the resulting ester was extracted with petroleum ether. The petroleum ether solution was washed with water, dried with $CaCl_2$ and fractionated. The resulting material was 7-methyl myristic acid ethyl ester having a boiling point of 173° C.

PREPARATION OF THE ESTER OF A BRANCH CHAIN ACID AND A BRANCH CHAIN ALCOHOL

Example No. 6

29.8 grams of 8-methyl stearic acid having a melting point of 33–33.5° C. were added to 80 ml. of thionyl chloride and boiled for 1 hour in a water bath under a reflux condenser. The excess of thionyl chloride was distilled off and 100 ml. of water-free pyridine was added to the residue. 15.8 grams of dihydrocitronellol were added to this mixture was allowed to cool and 200 ml. of a water-sodium bicarbonate solution was then added. The resulting ester was extracted by shaking with petroleum ether having a boiling point of 40–45° C. The petroleum ether solution was then dried with calcium chloride, filtered and the petroleum ether was distilled off under a high vacuum. The resulting 8-methyl stearic acid dihydrocitronellol esters had a boiling point of 130–132° C. at 0.03 mm. of mercury and a saponification value of 127.

Example No. 7

15.8 grams of tetrahydrogeraniol was reacted with 48% hydrobromic acid and concentrated sulfuric acid. The resulting bromide was dissolved in petroleum ether and washed with a water-sodium bicarbonate solution and subsequently dried with sodium sulfate. After filtering out the sodium sulfate and distilling off the petroleum ether, the terahydrogeranyl bromide was dissolved in 100 ml. of toluene and 41.8 grams of the silver salt of 2-ethyl stearic acid was then added to this solution. The silver salt was boiled with the bromide for 3 hours under a reflux condenser while being stirred. After this period the precipitated silver bromide was filtered and the toluene was distilled off under high vacuum. The resulting 2-ethyl stearic acid tetrahydrogeranyl ester had a boiling point in the range of 133–135° C. at 0.03 mm. of mercury and a saponification value of 124.5

Example No. 8

45.6 grams of 2,4-dimethyl lauric acid having a boiling point of 176–178° C. at 10 mm. of mercury was boiled for 1 hour under a reflux condenser with 70 ml. of thionyl chloride. The excess thionyl chloride was distilled off in the vacuum of the water pump. 36.4 grams of 2,4-dimethyl dodecanol having a boiling point of 140–142° C. at 8 mm. of mercury were dissolved in 20 ml. of pyridine and added to the acid chloride. This mixture was boiled for 5 minutes under a reflux condenser and dissolved in 100 ml. of petroleum ether and washed with a water solution of sodium bicarbonate. The mixture was then dried with calcium chloride, filtered and the petroleum ether distilled off. The resulting 2,4-dimethyl lauric acid- 2,4-dimethyl dodecanol ester had a boiling point of 185–187° C. at 0.03 mm. mercury and a saponification value of 131.8.

INCORPORATION OF THE BRANCH CHAIN MATERIAL IN COSMETIC AND PHARMACEUTICAL PRODUCTS

Example No. 9

6-methyl palmitic acid prepared as in Example 1 was incorporated in a lipstick having the following composition in weight percent:

| | Percent |
|---|---|
| Beeswax | 15 |
| Spermaceti | 3 |
| Vaseline | 45 |
| Peanut Oil | 17 |
| Sesame oil | 15 |
| 6-methyl palmitic acid | 5 |

Example No. 10

The branch chain alcohol prepared as in Example 2 was added to a cosmetic cream having the following composition in weight percent:

| | Percent |
|---|---|
| Stearic acid | 16 |
| Beeswax | 8 |
| Paraffin oil | 22 |
| Triethanolamine | 2 |
| Distilled water | 46 |
| 6-methyl hexadecanol | 6 |

Example No. 11

The branch chain ester prepared as in Example 4 was incorporated in a sunburn cream having the following composition in weight percent:

| | Percent |
|---|---|
| Beeswax | 18 |
| Liquid paraffin | 39 |
| Sunscreen | 10 |
| Water | 29 |
| Borax | 2 |
| Dihydro citronellol myristinate | 2 |

Example No. 12

The ester prepared in accordance with Example 6 was incorporated in a nail laquer having the following composition in weight percent:

| | Percent |
|---|---|
| Nitrocellulose | 10 |
| Butyl stearate | 2 |
| Aryl acetates | 80 |
| Pigment | 3 |
| 8-methyl stearic acid dihydro citronellol ester | 5 |

Example No. 13

The branch chain ester produced as in Example 7 was incorporated in a lotion having the following composition in weight percent:

| | Percent |
|---|---|
| Mineral oil | 12 |
| Olive oil | 6 |
| Ethyl alcohol | 1 |
| Stearic acid | 5 |
| Glycerine | 4 |
| 2-ethyl stearic acid tetrahydrogeranyl ester | 5 |
| Triethanolamine | 2 |
| Distilled water | 65 |

Various modes of carrying out the invention are contemplated as being within the scope of the following claims particularly pointing out and distinctly claiming the subject matter which is regarded as the invention.

I claim:

1. In a topically applied composition, a fat component having incorporated therewith from 1–95% by weight of an alkyl branch chain carboxylic acid, said acid having 2, 3, 4, 21, 22, 23 or 24 carbon atoms in the open chain and having at least one alkyl branch containing from 1–4 carbon atoms, the carbon atom in the carboxylic group being free of said branch chain and said acid being free of other substituent groups.

2. In a topically applied composition, a fat component having incorporated therewith more than 10% and up to 95% by weight of an alkyl branch chain carboxylic acid, said acid having from 2–24 carbon atoms in the open chain and having at least one alkyl branch containing from 1–4 carbon atoms with the carbon atom in the carboxylic group being free of said branch chain and said acid being free of other substitutent groups.

3. In a topically applied composition, a fat component having incorporated therewith from 1–95% by weight of an alkyl branch chain carboxylic acid, said acid having from 2–24 carbon atoms in the open chain and having at least one alkyl branch containing from 3–4 carbon atoms, the carbon atom in the carboxylic group being free of said branch chain and said acid being free of other substituent groups.

4. In a topically applied composition, a fat component having incorporated therewith from 1–95% by weight of an alkyl branch chain carboxylic acid, said acid having from 2–24 carbon atoms in the open chain having at least one alkyl branch containing from 1–4 carbon atoms, said open chain having 2 carbon atoms at each end separated by at least 1 central carbon atom and the central carbon atom being free of branches.

5. In a topically applied composition, a fat component having incorporated therewith from 1–95% by weight of an alkyl branch chain aliphatic alcohol, said alcohol having 2, 3, 4, 21, 22, 23 or 24 carbon atoms in the open chain and having at least one alkyl branch chain containing from 1–4 carbon atoms, said alcohol containing from 1–2 hydroxyl groups.

6. In a topically applied composition, a fat component having incorporated therewith more than 10% and up to 95% by weight of an alkyl branch chain aliphatic alcohol, said alcohol containing from 1–2 hydroxyl groups and having from 2–24 carbon atoms in the open chain and having at least one alkyl branch containing from 1–4 carbon atoms.

7. In a topically applied composition, a fat component having incorporated therewith from 1–95% by weight of an alkyl branch chain aliphatic alcohol, said alcohol containing from 1–2 hydroxyl groups and having from 2–24 carbon atoms in the open chain and having at least one alkyl branch containing from 3–4 carbon atoms.

8. In a topically applied composition, a fat component having incorporated therewith from 1–95% by weight of an alkyl branch chain aliphatic alcohol, said alcohol having two hydroxy groups and having from 2–24 carbon atoms in the open chain and having at least one alkyl branch containing from 1–4 carbon atoms.

9. In a topically applied composition, a fat component having incorporated therewith from 1–95% by weight of an alkyl branch chain aliphatic alcohol, said alcohol containing from 1–2 hydroxyl groups and having from 2–24 carbon atoms in the open chain and having at least one alkyl branch containing from 1–4 carbon atoms, the open chain having two carbon atoms at each end separated by at least one central carbon atom, and the central carbon atom being free of branches.

10. A topically applied composition, a fat component having incorporated therein from 1–95% by weight of an ester of an alkyl branch chain carboxylic acid with an alkyl branch chain aliphatic alcohol, said acid having from 2–24 carbon atoms in the open chain and having at least one alkyl branch containing from 1–4 carbon atoms with the carbon atom in the carboxylic group being free of said branch chain and said acid being free of other substituent groups, said alcohol containing from 1–2 hydroxyl groups and having from 2–24 carbon atoms in the open chain and having at least one alkyl branch containing from 1–4 carbon atoms.

11. The composition of claim 10 in which open chain of both the acid and the alcohol have at least 5 carbon atoms and the two end carbons in the open chain of both the acid and the alcohol are free of alkyl branches.

12. In a topically applied composition, a fat component having incorporated therewith from 1–95% by weight of tetrahydrogeranyl 3,7-dimethyl-octanoate.

13. In a topically applied composition, a fat component having incorporated therein from 1–95% by weight of an ester of the acid of claim 1 with a straight chain alcohol having up to 20 carbon atoms in the straight chain.

14. In a topically applied composition, a fat component having incorporated therein from 1–95% by weight of an ester of the acid of claim 2 with a straight chain alcohol having up to 20 carbon atoms in the straight chain.

15. In a topically applied composition, a fat component having incorporated therein from 1–95% by weight of an ester of the acid of claim 3 with a straight chain alcohol having up to 20 carbon atoms in the straight chain.

16. In a topically applied composition, a fat component having incorporated therein from 1–95% by weight of an ester of the acid of claim 4 with a straight chain alcohol having up to 20 carbon atoms in the straight chain.

17. In a topically applied composition, a fat component having incorporated therein from 1–95% by weight of an ester of the alcohol of claim 5 with a straight chain acid having up to 20 carbon atoms in the straight chain.

18. In a topically applied composition, a fat component having incorporated therein from 1–95% by weight of an ester of the alcohol of claim 6 with a straight chain acid having up to 20 carbon atoms in the straight chain.

19. In a topically applied composition, a fat component having incorporated therein from 1–95% by weight of an ester of the alcohol of claim 7 with a straight chain acid having up to 20 carbon atoms in the straight chain.

20. In a topically applied composition, a fat component having incorporated therein from 1–95% by weight of an ester of the alcohol of claim 8 with a straight chain acid having up to 20 carbon atoms in the straight chain.

21. In a topically applied composition, a fat component having incorporated therein from 1–95% by weight of an ester of the alcohol of claim 9 with a straight chain acid having up to 20 carbon atoms in the straight chain.

References Cited

UNITED STATES PATENTS 3,035,987   5/1962   Weitzel _____ 167—90

LEWIS GOTTS, *Primary Examiner.*

RICHARD L. HUFF, *Assistant Examiner.*

UNITED STATES PATENT OFFICE
CERTIFICATE OF CORRECTION

Patent No. 3,335,053                                                 August 8, 1967

Guenther Weitzel

It is hereby certified that error appears in the above numbered patent requiring correction and that the said Letters Patent should read as corrected below.

Column 1, line 22, for "ot" read -- to --; column 4, line 38, for "petroleum" read -- petrolatum --; line 56, for "laolin" read -- lanolin --; column 6, line 16, for "reached" read -- reacted --.

Signed and sealed this 1st day of October 1968.

(SEAL)
Attest:

Edward M. Fletcher, Jr.                                   EDWARD J. BRENNER
Attesting Officer                                                 Commissioner of Patents